Jan. 19, 1954    L. SKOK    2,666,397
MEANS FOR EMBODYING FRUIT IN DECORATIVE
DESIGNS IN BRICK ICE CREAM
Filed March 15, 1948    2 Sheets-Sheet 1

INVENTOR.
LAWRENCE SKOK,
BY
ATTY

Jan. 19, 1954

L. SKOK 2,666,397

MEANS FOR EMBODYING FRUIT IN DECORATIVE
DESIGNS IN BRICK ICE CREAM

Filed March 15, 1948

INVENTOR.
LAWRENCE SKOK,
BY
Justin Macklin
ATTY

Patented Jan. 19, 1954

2,666,397

UNITED STATES PATENT OFFICE 2,666,397

MEANS FOR EMBODYING FRUIT IN DECORATIVE DESIGNS IN BRICK ICE CREAM

Lawrence Skok, Euclid, Ohio

Application March 15, 1948, Serial No. 14,908

2 Claims. (Cl. 107—1)

The object of this invention is to provide a simple easily operable means for use in carrying out correspondingly simple steps for embodying, in brick ice cream, fruit syrups and flavors, or other materials, of a nature such as might be used for pouring over the ice cream when served as sundaes.

Heretofore, "hearts" or "centers" have been formed in brick ice cream by various methods which require special molds and a number of steps, usually including several manual operations.

An object of the present invention is to provide for embodying fruit syrup or other "center" material in the ice cream in a pint or quart container, for example, by a single simple step of inserting a pattern-forming nozzle into the body of the ice cream and uniformly depositing the center material in the desired pattern during a single quick withdrawing movement. Any edible flavoring or contrasting material may be used, but for convenience such center material is usually referred to herein as fruit or fruit syrup.

Other objects include varying the amounts and shape of the pattern of the fruit center with the same injecting and distributing tool without requiring any additional apparatus or additional steps, as will hereinafter appear.

In carrying out my invention I put the center material into the brick when it is about the consistency of fountain syrup and when the body of the ice cream in its container is in a semi-solid or "half frozen" condition as it comes from the freezing machine. The bricks are then subjected to lower temperature and as the ice cream hardens, the body of the ice cream with its flavoring and decorative center material becomes stiff and holds its shape throughout packing, handling and slicing for serving.

To further understand my invention, reference will now be made to the accompanying drawings, in which.

The material-injecting tool comprises essentially a distributing head, a hollow spout or stem, and the material-containing reservoir or cylinder and means for ejecting the material therefrom. These parts are subject to various modifications, and as shown and described in this application are intended to be illustrative only of a suitable means which I have found satisfactory.

The material-containing cylinder designated 1 is connected at one end by a removable cap or head 3 with the spout 5 comprising a rigid tube on the lower end of which is formed the distributing head.

Figure 3:
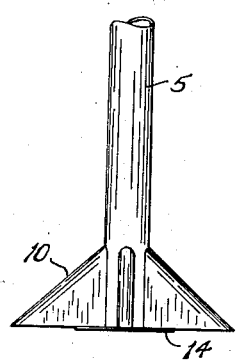
Fig. 3 is an elevation of the depositing head or nozzle.
Figure 4:
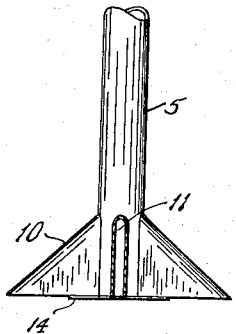
Fig. 4 is a similar view partly in section.
Figure 5:
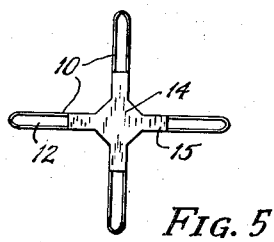
Fig. 5 is a bottom plan of same.
Figure 6:
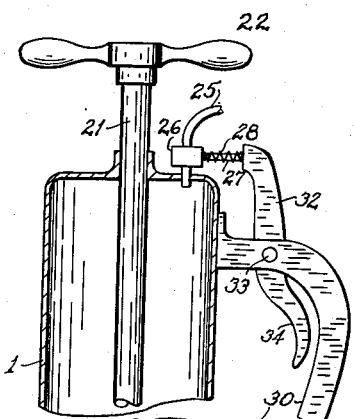
Fig. 6 is a view partly in section showing a fruit-containing cylinder and piston therein with the nozzle extending therefrom and showing manual and fluid pressure control means for actuating the piston.

A form of the head particularly illustrated in Figs. 3, 4 and 5 comprises a plurality, in this case, four outwardly projecting hollow wings 10 secured to the sides of the tube and having slot-like openings 11 communicating with the inner end of the tube, for a substantial distance upwardly from its lower end, and having discharge openings 12 (Fig. 5) facing downwardly and preferably lying in a substantially horizontal plane.

A thin plate-like closure 14, closing the lower end of the tube 5, may have outwardly extending portions 15 closing the inner parts of the slot-like openings of the wing members 10. These parts may be rigidly secured together as by brazing or the like. The upper sides or edges of the wing-like members 10 are curved and slope downwardly abruptly, which facilitates the withdrawal of the distributing head from the body of the ice cream.

The cylinder 1 is shown as having a piston 20 connected to a piston rod 21, and which may be provided with a suitable handle 22 for pressing downwardly on the material to be injected into the ice cream from the lower portion of the cylinder.

The piston may be actuated by various means. An illustration is that of admitting air pressure above the piston, as, for example, through a flexible conduit 25 under control of a valve indicated at 26.

A suitable handle 30 secured to the side of the cylinder may facilitate the use of the device, and, for convenience, the valve 26 may have an operating stem 27 adapted to be acted upon by a trigger member 32, pivoted at 33 to the handle, and having an extension 34 to receive finger pressure for operating the stem 27 to depress the same against the action of a spring 28 to open the valve and admit air above the piston.

Figure 1:
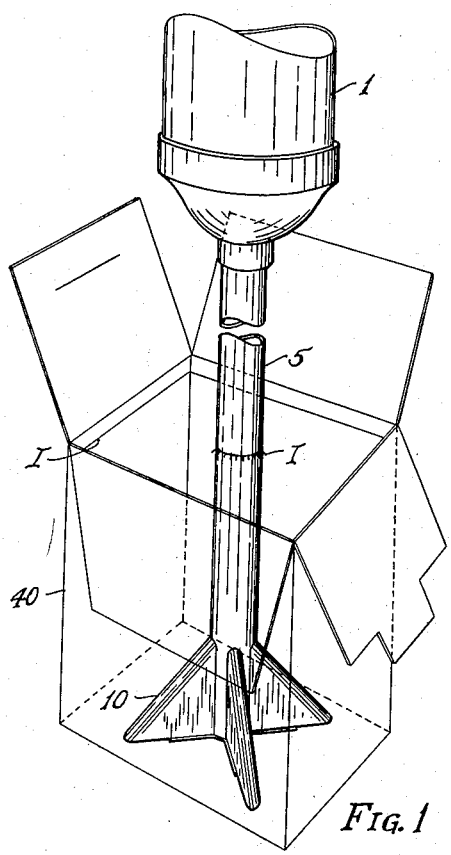
Fig. 1 is a view showing a fruit syrup containing cylinder and device for depositing fruit in the ice cream, showing a phantom view of an ice cream brick and container around the same.
Figure 2:
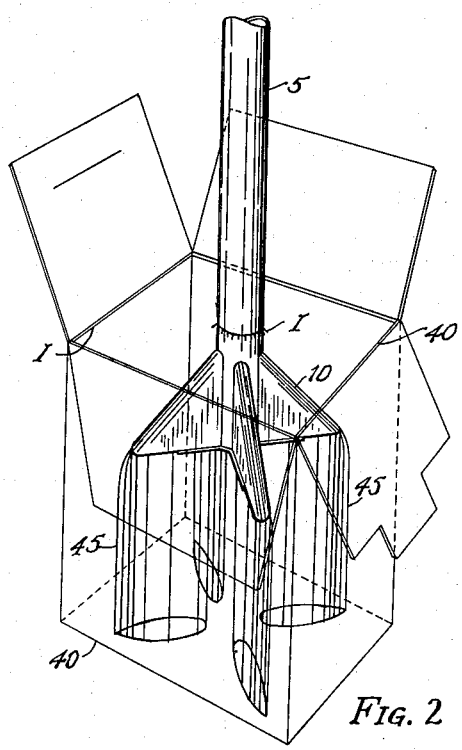
Fig. 2 illustrates the manner of depositing the material from the nozzles with a similar view of the ice cream container and lines diagrammatically indicating the deposited fruit in the ice cream.

Assuming now that ice cream from a freezer, in semi-solid state, has been put into a brick container, diagrammatically indicated at 40 (Figs. 1 and 2), with the cover flaps in an open position and standing upright, my device may now be used to inject the fruit center, as follows:

Assuming that the piston 20 has been retracted to the closed end of the cylinder 1, the cap 3 removed and the piston filled with the fruit syrup and again replaced, the cylinder with its attached spout and head is inverted and thrust vertically down through the body of the ice cream, the upper surface of which has been indicated at I (Figs. 1 and 2). The distributor head having been brought against the bottom of the container 40, pressure is exerted on the piston 20, and simultaneously upward movement of the cylinder, spout and head is commenced. Thus the head 10 is withdrawn while continuously depositing the fruit syrup by ejecting it from the openings 12, forming columns of the material in the body of ice cream, as indicated diagrammatically by the lines 45 in Fig. 2.

As the face of the distributor head and its discharge openings 12 reach the top of the ice cream, pressure on the piston 20 is relieved, and thus the ejection of the material from the head is stopped, and the contents of the brick container then comprise a brick with fruit center columns.

The cover flaps may be closed and the additional freezing and hardening of the ice cream may take place while the bricks are standing or when they are laid on the side.

I have found that as the material flows from the narrow slot-like discharge openings it spreads somewhat, forming outwardly pointed patterns of veins considerably larger in cross section and in radial length than the discharge openings 12.

The size and body of the injected fruit syrup or other material, of course, depends upon the relative injection pressure and rate of withdrawal of the distributing head.

Figure 7:
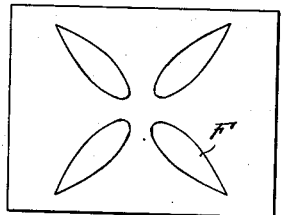
Fig. 7 is a face view of a slice or top of an ice cream brick after depositing the center material or fruit.

An illustrative pattern is indicated in Fig. 7 in which the rectangle B indicates the sides of the brick, while the conformation and sectional shape of the fruit centers are shown by the lines F.

Figure 8:
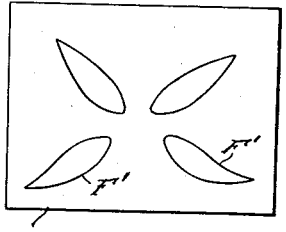
Fig. 8 shows the change in appearance as the brick is laid on its side while the ice cream is still semi-solid.

If the bricks are laid on the side during the hardening, further pointing and changes will occur due to settling somewhat of the slightly heavier fruit center material, giving patterns indicated in Fig. 8.

Here again the rectangle B indicates the sides of the brick, and the new and perhaps more decorative or artistic shape of the centers are indicated by the lines F'.

Figure 10:
Fig. 10 is a section taken on the lines 10—10 of Fig. 9.
Figure 10:
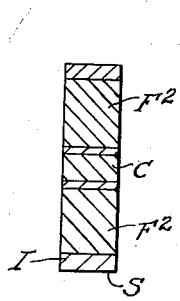
Figure 9:
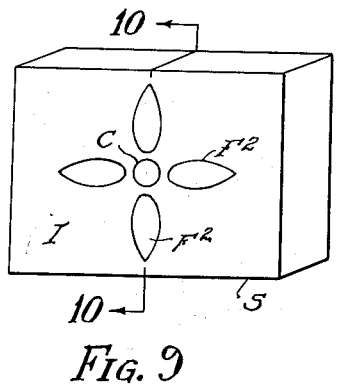
Fig. 9 is a perspective view of a brick, showing a different pattern of fruit center.

It will be understood, of course, that brick may be sliced for serving. Such a slice is indicated in Figs. 9 and 10 where I have also indicated a different fruit center pattern. Here the slice of ice cream is designated S, shown in perspective in Fig. 9 and in section in Fig. 10, the ice cream portion being designated I and the fruit center which in this case has a central portion C and the radiating portions $F^2$. Here again, the pattern may vary in radial length of the leaves and in size of the circle-like center C depending on the amount of material injected during the withdrawal movement of the distributor.

Figure 11:
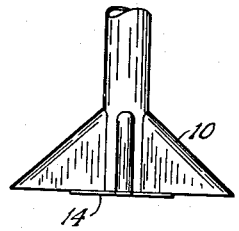
Fig. 11 is a modified form of nozzle having a central opening for making the pattern such as shown in Fig. 9.

In Fig. 11 I have shown a bottom view of the distributor head in which the end of the spout 5 is closed by a plate 14a having a central hole 17 for forming the section of the inserted material C.

Figure 12:
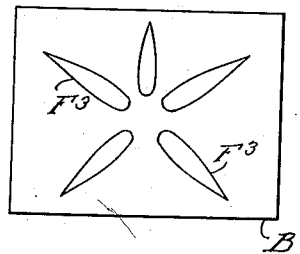
Fig. 12 is a face view of a brick having a fruit center of different pattern with more leaves or blades.
Figure 13:
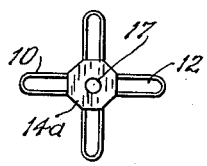
Fig. 13 is a diagrammatic view illustrating the shape taken by such a fruit center as the material flows somewhat when the brick is laid on its side before hardening.
Figure 13:
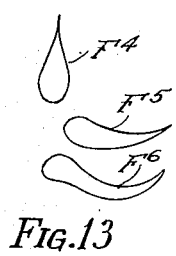

As stated, various modifications of shape and pattern may be used. In Fig. 12, for example, I have shown the effect of a distributor head having five radial discharge openings forming the five radial inserts or veins $F^3$ in the brick. Modifications of such a pattern may be further effected by tipping the brick on its side when in a semi-solid condition and settling of the veins will result. In Fig. 13 is shown diagrammatically the effect of such settling. $F^4$ illustrates the effect on the insert which remains vertical. $F^5$ indicates the curving effect of the next lower one at the side, while the lower veins may become even more curved and elongated, as shown at $F^6$.

As stated, these patterns may be widely varied in shape and volume, although I have found the non-uniform floral effects have great appeal.

Thus, the settling during the hardening and stiffening of the ice cream changing the shape, produces more artistic and less formal or geometric patterns of the inserts.

From the foregoing description it will be seen that with a nozzle or distributing head various patterns in the nature of floral designs, propeller blades, and numerous other more or less symmetrical radiating forms of inserts may be made.

While I have refered frequently to fruit syrup in the foregoing, obviously any materials such as suitable for serving ice cream as a sundae may be used.

The thickness or volume may be changed in increasing the content of the fruit in the brick by simply moving the head upwardly from the bottom while maintaining the same or increased pressure on the piston on the cylinder content.

In practice it is found that the syrup should preferably be injected while at temperatures of thirty to thirty-five degrees Fahrenheit, and while the ice cream in the brick container is held at twenty to twenty-five degrees Fahrenheit, which condition is usually referred to as "half-frozen."

Care should be used to avoid having the syrup too thick, to avoid crystallization or excessive body thereof. The portions ejecting from the nozzle should preferably be kept separate to maintain the pattern.

As stated, the injecting device may be automatic or manual. The piston may be moved manually or under the control of air pressure and a trigger at the handle, if desired.

Having thus described my invention, what I claim is:

1. A device for embodying center flavoring material in predetermined pattern in brick ice cream while in a semi-solid state in a container, comprising a vertical tube having outwardly and downwardly flaring wings of less width than the diameter of the tube and opening downwardly in a substantially common plane with the lower end of the tube and radiating from the tube as a common center, each wing having a downwardly opening slot-like discharge orifice, means for forcing the flavoring material through the tube and wings whereby the material may be simultaneously ejected from the several slot-like openings while the wings are being withdrawn upwardly through the semi-solid ice cream, the sloping upper edges of the wings being curved to facilitate the withdrawal.

2. The device defined in claim 1 in which the lower end of the tube is closed and the slot-like openings extend outwardly each from a point removed from the diameter of the tube whereby the flavoring material is deposited at a distance from the tube as it is withdrawn.

LAWRENCE SKOK.

References Cited in the file of this patent

UNITED STATES PATENTS

| Number | Name | Date |
| --- | --- | --- |
| 2,042,940 | Herron | June 2, 1936 |
| 2,085,495 | Fulkerson | June 29, 1937 |
| 2,207,616 | Howser | July 9, 1940 |
| 2,246,871 | Balch | June 24, 1941 |
| 2,260,298 | Cowling | Oct. 28, 1941 |
| 2,271,767 | Hummel | Feb. 3, 1942 |
| 2,289,326 | Howser | July 7, 1942 |
| 2,316,165 | Howser | Apr. 13, 1943 |
| 2,344,901 | Routh | Mar. 21, 1944 |
| 2,347,083 | Connellee et al. | Apr. 18, 1944 |

FOREIGN PATENTS

| Number | Country | Date |
| --- | --- | --- |
| 355,608 | Great Britain | Aug. 27, 1931 |